March 21, 1933. E. KERN 1,902,131
DIRECT CURRENT MOTOR COMMUTATING DEVICE
Filed Feb. 27, 1932
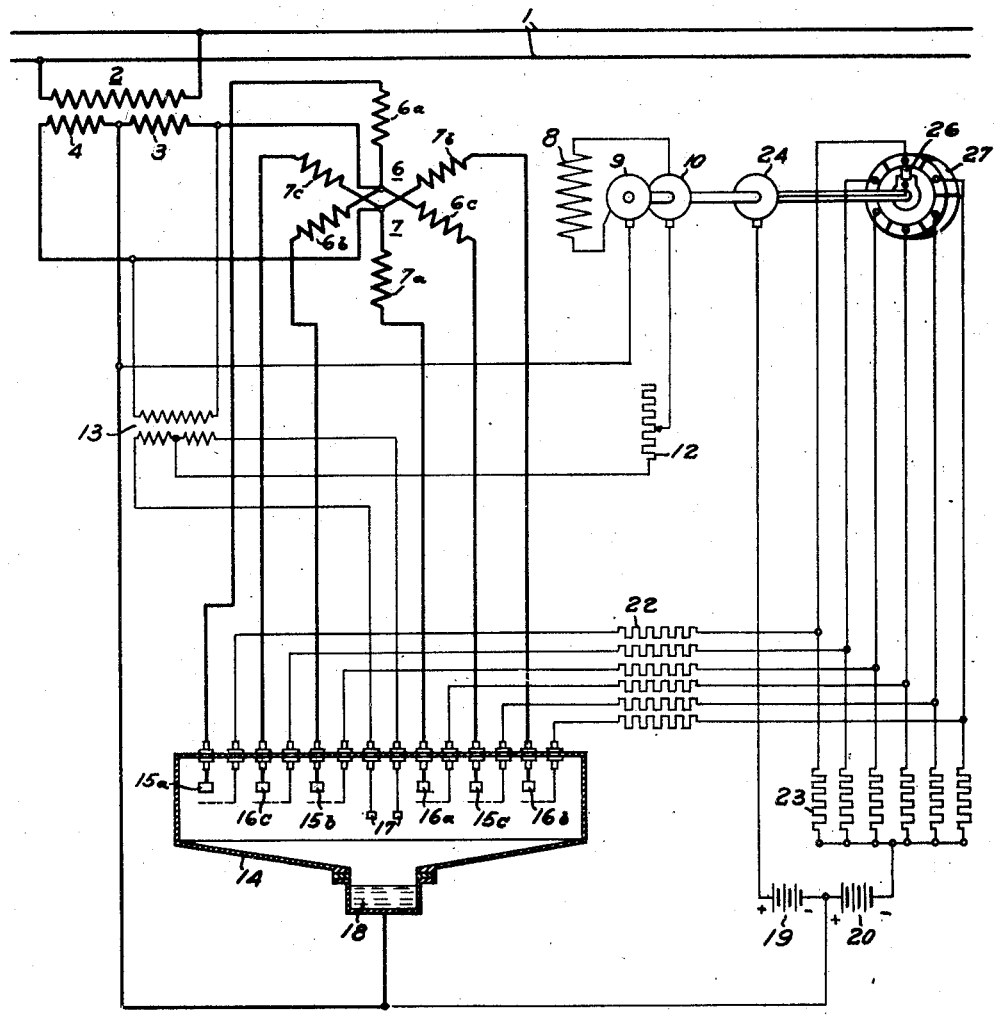
Inventor
E. Kern
by
Attorney Patented Mar. 21, 1933

1,902,131

UNITED STATES PATENT OFFICE

ERWIN KERN, OF ENNETBADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

DIRECT CURRENT MOTOR COMMUTATING DEVICE

Application filed February 27, 1932, Serial No. 595,536, and in Germany February 23, 1931.

I have filed an application in Germany, February 23, 1931.

This invention relates to improvements in electric motors in which the voltage applied to the motor is not limited by the voltage applicable to each segment of a commutator and hence to the number of segments available.

The difficulties attendant upon the commutation of electric current supplied to electric motors may be avoided by replacement of the mechanical commutation in use heretofore by a process of electronic commutation such as takes place in an electric current rectifier of the metallic vapor arcing type in which the arc is controlled by the use of control electrodes associated with the operating anodes of the rectifier as is well known. Such electronic commutation may be used for motors supplied either with direct or alternating current.

When the motor is supplied with direct current, an auxiliary device of some character is necessary to start the motor because the commutating rectifier can not be controlled unless the motor is in operation. When the motor is supplied with alternating current, an auxiliary device is also necessary to convert the alternating current into direct current if the field winding of the motor is excited in dependence on the voltage supplied to the motor from an external source or from the voltage supplied for operating the motor.

It is, therefore, among the objects of the present invention to provide a system for commutating the current supplied to an electric motor without regard to the voltage which may be applied to each segment of a commutator and hence to the number of segments.

Another object of the invention is to provide a system for commutating the current supplied to an electric motor in which system an electric current rectifier is employed for commutating.

Another object of the invention is to provide a system for commutating the current supplied to an electric motor in which system no auxiliary devices are necessary to control the excitation of the field winding of the motor.

Another object of the invention is to provide a system for commutating the current supplied to an electric motor in which system the source of current employed for maintaining the rectifier in excited condition is also used as the source of current to energize the motor field winding.

Objects and advantages other than those above set forth will be apparent from the following description when read in connection with the accompanying drawing, which diagrammatically illustrates one embodiment of the present invention in which the stator armature windings of an electric motor are supplied with current from a transformer and the current in the stator windings is commutated by an electric current rectifier while the current is supplied to the rotor field winding of the motor from the same source as is used to supply current to the excitation anodes of the rectifier.

Referring more particularly to the drawing by characters of reference, the reference number 1 designates a transmission line for single phase alternating current supplied from a suitable source (not shown). A transformer comprising the primary winding 2 and a secondary winding, divided into two portions 3 and 4, is connected with the supply line 1. The terminals of the secondary winding are connected with the neutral points of star-connected windings 6 and 7 each having the winding portions designated 6a, 6b, 6c, and 7a, 7b, 7c, respectively. The windings 6 and 7 from the stator armature windings of a motor having a field excitation rotor winding 8. The terminals of the field winding 8 are connected with slip rings 9 and 10, the slip ring 10 being connected through a variable resistance 12, to limit the current drawn from the secondary winding of a transformer 13 which is connected across the terminals of the secondary winding 3, 4 of the supply transformer, by the field 8, thus permitting speed regulation of the motor. The several portions of the armature windings 6 and 7 are connected with the anodes of an electric current rectifier 14 of the metallic vapor arcing type, the anodes of which are designated 15a, 15b, 15c, and 16a, 16b, 16c. All of the anodes 15 are connected with the stator winding 6 and all of the anodes 16 are connected with the stator winding 7, e. g. stator winding portion 7a is connected with anode 16a, winding portion 7b is connected with anode 16b, etc. The rectifier 14 is provided with a vaporizable material, such as mercury, forming the cathode 18, which is connected with the midtap of the transformer secondary windings 3 and 4. Slip ring 9 is connected with the conductor connecting the cathode and the secondary winding of the supply transformer. The secondary winding of the transformer 13 is connected with a pair of auxiliary anodes 17 arranged within the rectifier to maintain the same in excited condition, i. e., to maintain the arc within the rectifier after such arc has been produced by an ignition anode of any well known character and therefore not herein shown.

A plurality of sources of direct current, such as batteries 19, 20, are connected with the cathode 18, the negative terminal of source 20 being connected through current limiting resistances 22 and 23 with control electrodes associated with each of the main anodes 15a, 16a, etc. of the rectifier 14. The positive terminal of battery 19 is connected through a slip ring 24 with a brush 26 rotating in contact with a distributor 27 of which the several segments are connected through the resistances 22 and 23 with the negative terminal of battery 20 and with the control electrodes associated with the main anodes of the rectifier.

In operation, when the several portions of the system are in the position shown, assuming that an arc has been produced by operation of a suitable ignition anode, current flows from line 1 through the primary winding 2 of the supply transformer, through the secondary winding 3 and 4 thereof to the primary winding of transformer 13. A current is thus induced in the secondary winding of the transformer 13 and flows alternately through each of the excitation anodes 17 to the cathode 18, slip ring 9, field winding 8, slip ring 10, resistance 12, and back to the mid-point of the secondary winding of transformer 13. Current also flows from secondary winding 3 to the neutral point of the stator winding 6 and from such neutral point the current flows through the stator winding portion 6a to anode 15a, to cathode 18 and back to the mid-point connection between the transformer secondary winding sections 3 and 4.

The anode 15a picks up the arc for the reason that, at such time, a positive potential relative to the cathode potential is impressed on the control electrode associated therewith from battery 19 over slip ring 24 and brush 26, distributor 27, and resistance 22. The control electrodes associated with all of the main anodes other than the anode 15a, at such time, have a negative potential relative to the cathode potential impressed thereon from battery 20 through resistances 23 and 22.

Upon completion of the above circuits whereby one of the stator winding portions and the field winding are energized, the rotatable winding, here shown as the field winding, though it will be understood that the windings 6 and 7 may be made rotatable if desired, moves one-sixth of a revolution.

Assuming now that field winding 8 has rotated one-sixth of a revolution it will now be in operative position relative to the portion 7b of stator winding 7. A positive potential relative to the cathode potential is now impressed on the control electrode associated with anode 16b from battery 19 over slip ring 24, brush 26, distributor 27 and resistance 22. The control electrodes associated with all of the other main anodes have a negative potential, relative to the cathode potential, impressed thereon from the battery 20 through resistances 23 and 22 thus preventing the arc from attaching to such anodes. A current will, therefore, flow through portion 4 of the supply transformer secondary winding, which current will flow to the neutral point of winding 7, through winding portion 7b, anode 16b to cathode 18 and back to the transformer winding 4. The field winding will then be rotated another one-sixth of a revolution into operative relation to winding portion 6c. The arc will be maintained between the excitation anodes and the cathode by the circuit above described and the field winding 8 will be energized by current flowing through the circuit also above described.

The circuits above described are similar to the circuits completed throughout one entire revolution of the field winding except that different portions of windings 6 and 7 and the anodes associated therewith are sequentially energized due to the sequential impression of positive potential from the source 19 upon the control electrodes by the operation of the distributor.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a commutating system for electric motors, a motor having a stator winding and a rotor winding, an alternating current supply line, an electric current rectifier having main anodes, excitation anodes and a cathode, the said stator winding being connected in circuit with the main anodes and with the cathode and with said line to be supplied with current from the latter, the said rotor winding being connected in circuit with the excitation anodes and with the cathode and with said line to be supplied with current from the latter, and means for sequentially causing flow of current through the anodes, the cathode and said windings from said line.

2. In a commutating system for electric motors, an alternating current supply line, a transformer connected with said line, a stator winding connected with said transformer, an electric current rectifier having main anodes, excitation anodes and a cathode, said stator winding being connected with the main anodes of the said rectifier, the cathode of said rectifier being connected with said transformer, a second transformer connected with the excitation anodes of said rectifier and with the first said transformer, a rotor winding connected with the excitation anodes of said rectifier and with said second transformer, and means for sequentially causing flow of current through the main anodes of said rectifier.

3. In a commutating system for electric motors, an alternating current supply line, a transformer connected with said line, a stator winding divided into a plurality of groups each having a neutral point connected with one of the terminals of said transformer, an electric current rectifier having main anodes, excitation anodes and a cathode, said stator winding being connected with the main anodes of said rectifier, the cathode of said rectifier being connected with said transformer, a second transformer connected with the excitation anodes of said rectifier and with the first said transformer, a rotor winding connected with the excitation anodes of said rectifier and with said second transformer, and means for sequentially causing flow of current through the main anodes of said rectifier.

4. In a commutating system for electric motors, an alternating current supply line, a transformer connected with said line, a stator winding connected with said transformer, an electric current rectifier having main anodes, control electrodes associated with the main anodes, excitation anodes and a cathode, said stator winding being connected with the main anodes of said rectifier, the cathode of said rectifier being connected with said transformer, a second transformer connected with the excitation anodes of said rectifier and with the first said transformer, a rotor winding connected with the excitation anodes of said rectifier and with said second transformer, means for impressing a potential on the control electrodes, and means for periodically changing the potential impressed on the control electrodes to control flow of current through the main anodes of said rectifier.

5. In a commutating system for electric motors, an alternating current supply line, a transformer connected with said line, a stator winding connected with said transformer, an electric current rectifier having main anodes, excitation anodes and a cathode, said stator winding being connected with the main anodes of the said rectifier, the cathode of said rectifier being connected with said transformer, a second transformer connected with the excitation anodes of said rectifier and with the first said transformer, a rotor winding connected with the excitation anodes of said rectifier and with said second transformer, means for regulating the current supplied to said rotor winding from said transformer, and means for sequentially causing flow of current through the main anodes of said rectifier.

6. In a commutating system for electric motors, an alternating current supply line, a transformer connected with said line, a stator winding connected with said transformer, an electric current rectifier having main anodes, excitation anodes and a cathode, said stator winding being connected with the main anodes of the said rectifier, the cathode of said rectifier being connected with said transformer, a second transformer connected with the excitation anodes of said rectifier and with the first said transformer, a rotor winding connected with the excitation anodes of said rectifier and with said second transformer, a source of direct current for impressing a negative potential relative to the potential of the cathode on the control electrodes, a source of direct current at a positive potential relative to the potential of the cathode, and a distributor for sequentially controlling the connection of the second said source of current with the control electrodes to control the operation of the main anodes.

In testimony whereof I have hereunto subscribed my name this 9th day of February A. D. 1932.

ERWIN KERN.